United States Patent Office 3,580,968
Patented May 25, 1971

3,580,968
PROCESS FOR PREPARING N,N-DIALKYL-
ACYLAMIDES
Michio Kuraishi, Setunobu Asano, and Nobuo Isogai, Niigata-shi, Japan, assignors to Japan Gas-Chemical Company, Inc., Tokyo, Japan
No Drawing. Filed Apr. 30, 1969, Ser. No. 820,617
Claims priority, application Japan, May 9, 1968, 43/31,096
Int. Cl. C07c 103/00
U.S. Cl. 260—561R
6 Claims

ABSTRACT OF THE DISCLOSURE

N,N-dimethylacylamides are prepared with commercial advantages by reacting trimethylamine with lower fatty acids or esters thereof or compounds capable of forming said acids or esters by reaction with carbon monoxide at elevated temperatures and under high pressures and in the presence of metal carbonyls, e.g. aliphatic alcohols and ethers, and with carbon monoxide at elevated temperatures and under high pressures in the presence of metal carbonyls either singly or in combination with halogens or halogen compounds.

---

This invention relates to a process for preparing N,N-dialkylamides of fatty acids. More particularly, the invention pertains to a method for producing N,N-di-lower alkylacylamides by the reaction of tri-lower alkylamines with acyl compounds and carbon monoxide.

COMPOUNDS

N,N-di-lower alkylacylamides, e.g. N,N-dimethylacetamide, N,N-dimethylpropionamide, N,N-diethylacetamide and N,N-diethylpropionamide, have wide uses as solvents. Particularly, N,N-dimethylacetamide is quite useful as a solvent for polyacrylonitrile.

PRIOR ART

Heretofore, N-N-di-lower alkylacylamides have been prepared according to a method in which di-lower alkylamides are reacted with fatty acids or esters thereof. This method is, indeed, preferable because the reaction itself progresses smoothly, but encounters a drawback in obtaining the starting di-lower alkylamines. That is, the production of di-lower alkylamines by reaction of alcohols with ammonia accompanies the by-production of large amounts of mono- and tri-lower alkylamines, which are limited in commercial uses. This makes it disadvantageous to select di-lower alkylamines as starting materials. On the other hand, there has been proposed a process for preparing N,N-di-lower alkylacylamides by using as starting materials tri-lower alkylamines which are less in demand and reacting them with carbon monoxide. For example German Pat. No. 948,056 discloses a process for preparing N,N-dimethylacetamide by reacting trimethylamine with carbon monoxide in a solvent of N-methylpyrrolidone in the presence of a catalyst of an organic onium salt of cobalt such as di-[tetramethylammonium]-cobalt dibromide diiodide. This process is favorable in yield but is effected under such severe conditions as a pressure of 700 atm., a temperature of 200° C., and a reaction time of 7 hours that it can not always be said to be industrially advantageous.

The present inventors made repeated studies on processes for preparing N,N-di-lower alkylacylamides by using tri-lower alkylamines as starting materials. As the result, the inventors have found that, when reacted in the presence of a metal carbonyl catalyst, tri-lower alkylamines, acyl group-containing compounds and carbon monoxide give N,N-di-lower alkylacylamides in high yields under relatively mild reaction conditions.

OBJECT

It is therefore the object of the present invention to provide an advantageous process for preparing N,N-di-lower alkylacylamides by using tri-lower alkylamines as starting materials.

PROCESS

In accordance with the present invention, there is provided a process for preparing N,N-di-lower alkylacylamides by reacting tri-lower alkylamines with acyl group-containing compounds and carbon monoxide at elevated temperatures and pressures in the presence of metal carbonyls.

The tri-lower alkylamines employed in the present process are those in which the alkyl group is a methyl, ethyl or propyl group. Particularly when trimethylamines are used, corresponding N,N-dimethylacylamides can be obtained in high yields.

The acyl group-containing compounds employed in the present process signify, in a narrow sense, lower fatty acids such as formic, acetic, propionic and butyric acids, and methyl, ethyl and the like esters of said acids. In a broad sense, however, the said compounds include compounds capable of forming, under the conditions adopted in the present process, the above-mentioned fatty acids or esters thereof, e.g. lower alcohols such as methyl alcohol and ethyl alcohol, and lower alkyl ethers such as methyl ether and ethyl ether.

The metal carbonyls employed in the present process are cobalt carbonyl, nickel carbonyl and iron carbonyl, though these are not limitative. As these metal carbonyls, those which have been prepared in advance may be added at the time of reaction. It is, however, convenient to form metal carbonyls during the reaction by adding, at the time of reaction, metals or compounds of said metals capable of forming said metal carbonyls under the conditions adopted in the present process, e.g. such metals as cobalt, nickel or iron, and such compounds of said metals as, for example, halides such as iodides or bromides or organic acid salts such as acetates or propionates, or other salts such as hydroxides, carbonates or bicarbonates.

According to the present process, the desired N,N-dialkylacylamides can be obtained in high yields under relatively mild reaction conditions. The present inventors believe the reaction mechanism is as follows without any limitation to the present invention by any define theory:

For example, in the case where N,N-dimethylacetamide is prepared by use of trimethylamine and acetic acid as starting materials, it is considered that the reaction progresses according to the equations.

$(CH_3)_3N + CH_3COOH \rightarrow CH_3CON(CH_3)_2 + CH_3OH$ (1)

$CH_3OH + CO \rightarrow CH_3COOH$ (2)

In case carbon monoxide is not present, only the Reaction 1 takes place and therefore no high yield can be expected. Due to the presence of carbon monoxide, however, the methyl alcohol formed in Reaction 1 is consumed according to Reaction 2 and is converted to the starting acetic acid. It is therefore considered that Reaction 1 is promoted more advantageously in consideration of equilibrium and N,N-dimethylacetamide is obtained in a high yield from acetic acid and methyl alcohol, without forming such by-product as methyl acetate.

In the case where other acyl group-containing compound (in such a narrow sense as mentioned previously) is used as a starting material, it is also believed that the reaction progresses in the same manner as above. That is, in case methyl acetate is used in place of the acetic acid, it is considered that the reaction progresses according to the equations $$(CH_3)_3N + CH_3COOCH_3 \rightarrow CH_3CON(CH_3)_2 + CH_3OCH_3 \quad (3)$$

$$CH_3OCH_3 + CO \rightarrow CH_3COOCH_3 \quad (4)$$

to give N,N-dimethylacetamide, and that, the starting methyl acetate is freshly formed according to Reaction 4 and again takes part in Reaction 3.

On the other hand, in the case of methyl alcohol and dimethyl ether, i.e., compounds capable of forming acyl groups under the reaction conditions of the present process (acyl group-containing compounds in such a broad sense as mentioned previously) as a starting material, it is considered that acetic acid and methyl acetate, i.e. acyl group-containing compounds in such a narrow sense as mentioned previously, are formed under the reaction conditions of the present process due to the presence of carbon monoxide, and thereafter the reaction proceeds according to the Equations 1 and 2 or 3 and 4.

In any case, the starting materials should be selected so as to conform to the kind of the resulting products. If single products are desired to be obtained, trialkylamines having same alkyl groups should be used and, in case esters or ethers are employed, alcohol residues of the esters or alkyl groups of the ethers should be identical with the alkyl groups of said trialkylamines.

In case, N,N-dimethylacetamide is desired to be obtained, the present process is quite successfully effected by using trimethylamine and acetic acid as starting materials. In this case, the desired product is obtained in a yield of about 90% based on the trimethylamine in a reaction time of 1-2 hours. If an acetic acid ester is used in place of acetic acid, N,N-dimethylacetamide is obtained in a yield of about 70% based on the trimethylamine in a reaction time of 5-7 hours. In this case, the yield is somewhat lower than in the case where trimethylamine and acetic acid are used in combination.

In the present process, halogens and/or halides may be added to the reaction system, whereby the object of the invention can be more effectively accomplished. Among the halogens and halides employed, such halogens as iodine and bromine and such halides as iodide and bromide are particularly effective. These halides may be used in the form of metal halides such as, for example, sodium bromide, potassium bromide, sodium iodide and potassium iodide. They may also be used in the form of metal compounds employed for metal carbonyls, such as for example, cobalt iodide, nickel bromide, etc.

The starting tri-lower alkylamine and acyl group-containing compound are ordinarily used in equimolar amounts. However, in case acetic acid, for example, is used as a starting material, there is effected such regeneration of the starting material that methyl alcohol formed by the reaction is further converted to acetic acid by means of carbon monoxide. It is therefore possible to use the trialkylamine in excess. Conversely, the acyl group-containing compound may be used in excess. These matters may be optionally decided depending on the kind of starting materials and desired products. Carbon monoxide should be used in an amount sufficient to convert the acyl group-containing compounds in such a broad sense as mentioned previously to the acyl group-containing compounds in such a narrow sense as mentioned previously and more importantly in an excess amount sufficient to maintain the reaction pressure. Further, carbon monoxide employed is not always required to be pure but may have been incorporated with hydrogen and the like impurities so far as said impurities are contained in such amounts as to give no detrimental effect to the reaction. The amount of the metal carbonyl as catalyst, when calculated as the metal, is 1-200 mg. atoms, preferably 5-30 mg. atoms, per mol of the trialkylamine. Further, the amount of the halogen or halide, when calculated as the halogen, is 0.1-500 mg. mols, preferably 5-1000 mg. mols, per mol of the trialkylamine.

Even when the amount of the metal carbonyl or of the halogen or halide is less than the lower limit of the aforesaid range, the reaction progresses. In such a case, however, the reaction rate is undesirably lowered. The upper limit of said range is decided in consideration of the solubility of the catalyst in the starting materials and the products. Even if the catalyst has been used in an unnecessarily large amount, excess amount of catalyst deposits and does not act effectively. Thus, the use of the catalyst is excessively large amount is not necessary.

The present process is advantageously effected in such a manner that reactants and a metal carbonyl, or a metal or metal compound capable of forming the metal carbonyl and, if necessary, halogens and/or halides as a catalyst, are fed to a pressure vessel, carbon monoxide is introduced under pressure into the vessel, and the temperature is elevated while stirring the content of the vessel. In the above reaction, solvents are not always required to be used, but may be used, if necessary. As solvents, for example, hydrocarbons, carboxylic acid amides, N-alkyl lactam and lower aliphatic nitriles such as acetonitriles, propionitrile, etc. are used. Ketones such as acetone, methylethylketone, etc. and water may be used as solvents, too.

The reaction is carried out at 150°-320° C. Even at a lower temperature, the reaction progresses, but the adoption of such a lower temperature is not practical in view of the reaction rate. On the other hand, the adoption of an excessively high temperature brings about side reactions and hence is not desirable. A preferable temperature is within the range of 200° to 280° C.

The reaction pressure is from 100-600 kg./cm.² (gauge). The adoption of a pressure lower than 100 kg./cm.² or higher than 600 kg./cm.² is not practical in view of the reaction rate and equipments. A preferably reaction pressure is within the range of 150 to 300 kg./cm.².

Modes of practice of the present invention are shown below with reference to examples.

EXAMPLE 1

To a 100 ml., Hastelloy C-made, shaking type autoclave were fed 16.1 g. of trimethylamine, 17.0 g. of acetic acid, and 15 mg. mols and 22 mg. mols per mole of the trimethylamine of cobalt acetate [(CH₃CO₂)₂Co·4H₂O] and potassium iodide (KI), respectively. Into the autoclave was introduced under pressure carbon monoxide to a pressure of 182 kg./cm.², and reaction was effected for 2 hours at a temperature of 240°-250° C. under a pressure of 380-160 kg./cm.². After completion of the reaction, the pressure lowered to 70 kg./cm.². The reaction product was analyzed to obtain 13.5 g. of acetic acid, 1.1 g. of methyl acetate and 21.7 g. of N,N-dimethylacetamide. The yield of the N,N-dimethylacetamide based on the starting trimethylamine is 91.6%.

EXAMPLE 2

To an autoclave were fed 12.0 g. of trimethylamine, 11.2 g. of acetic acid and 30 mg. mols per mol of the trimethylamine of cobalt iodide (CoI₂). Into the autoclave was introduced under pressure carbon conoxide to a pressure of 170 kg./cm.², and reaction was effected at a temperature of 240°-250° C. for 1.5 hours. After completion of the reaction, the pressure lowered to 81 kg./cm.². The reaction product was analyzed to obtain 16.0 g. of N,N-dimethylacetamide. The yield of the N,N-dimethylacetamide based on the starting trimethylamine is 90.8%.

EXAMPLE 3

To an autoclave were fed 12 g. of trimethylamine, 15 g. of methyl acetate, and 20 mg. mols and 30 mg. mols per mol of the trimethylamine of cobalt acetate

[(CH₃CO₂)₂Co·4H₂O]

and potassium iodide (KI), respectively. Into the autoclave was introduced under pressure carbon monoxide to a pressure of 192 kg./cm.², and reaction was effected for 7 hours at a temperature of 270°–280° C. under a pressure of 460–238 kg./cm.². After completion of the reaction, the pressure lowered to 104 kg./cm². The reaction product was analyzed to obtain 3.6 g. of methyl acetate and 12.5 g. of N,N-dimethylacetamide. The yield of the N,N-dimethylacetamide based on the starting trimethylamine is 70.5%.

EXAMPLE 4

To an autoclave were fed 7.8 g. of trimethylamine, 6.0 g. of methyl alcohol, 3.7 g. of water, 1.2 g. of acetic acid, and 22 mg. mols and 180 mg. mols per mol of the trimethylamine of cobalt acetate [$(CH_3CO_2)_2Co \cdot 4H_2O$] and potassium iodide (KI), respectively. Into the autoclave was introduced under pressure carbon monoxide to a pressure of 215 kg./cm.², and reaction was effected for 3 hours at a temperature of 250°–260° C. under a pressure of 420–265 kg./cm.². After completion of the reaction, the pressure lowered to 109 kg./cm.². The reaction product was aanylzed to obtained 9.7 g. of N,N-dimethylacetamide. The yield of the N,N-dimethylacetamide based on the starting trimethylamine is 84.5%. The reaction product (28.1 g.) contained, in addition to the N,N-dimethylacetamide, 4.4 g. of formic acid-water mixture, 2.9 g. of acetic acid, 1.1 g. of methyl acetate, 0.9 g. of methyl formate, 1.9 of methyl alcohol and 0.6 g. of N,N-dimethylformamide.

EXAMPLE 5

To an autoclave were fed 6.5 g. of trimethylamine, 5.0 g. of propionic acid, and 18 mg. mols and 27 mg. mols per mol. of the trimethylamine of cobalt acetate $$[(CH_3CO_2)_2Co \cdot 4H_2O]$$

and potassium iodide (KI), respectively. Into the autoclave was introduced under pressure carbon monoxide to a pressure of 205 kg./cm.², and reaction was effected for 5 hours at a tempertaure of 270°–280° C. under a pressure of 438–376 kg./cm.². After completion of the reaction the pressure lowered to 168 kg./cm.². The reaction product was analyzed to obtain 0.25 g. of unreacted propionic acid, 3.5 g. of N,N-dimethylpropionamide and 3.3 g. of N,N-dimethylacetamide. The yields of the N,N-dimethylacetamide and the N,N-dimethylpropionamide based on the starting trimethylamine are 34.4% and 31.5%, respectively. The reaction product contained, in addition to said, N,N-dimethylpropionamide and N,N-dimethylacetamide, a trace amount of methyl acetate, 0.2 g. of methyl alcohol and 0.6 g. of acetic acid.

EXAMPLE 6

To an autoclave were fed 14.3 g. of trimethylamine, 13.2 g. of formic acid, 2.2 g. of water, and 14 mg. mols and 24 mg. mols per mol of the trimethylamine of cobalt acetate [$(CH_2CO_2)_2Co \cdot 4H_2O$] and potassium iodide (KI), respectively. Into the autoclave was introduced under pressure carbon monoxide to a pressure of 250 kg./cm.², and reaction was effected for 3 hours at a temperature of 200°–265° C., under a pressure of 490–462 kg./cm.². After completion of the reaction, the pressure lowered to 188 kg./cm². The reaction product was analyzed to obtain 1.5 g. of a formic acid-water mixture, a trace amount of methyl acetate, 0.3 g. of methyl alcohol, 2.6 g. of acetic acid, 14.1 g. of N,N-dimethylacetamide and a certain amount of N,N-dimethylformamide. The yield of the N,N-dimethylacetamide based on the starting trimethylamine is 67%.

EXAMPLE 7

To an autoclave were fed 12.5 g. of trimethylamine, 13.0 g. of acetic acid and 25 mg. mols per mol of the trimethylamine of cobalt carbonyl. Into the autoclave was introduced under pressure carbon monoxide to a pressure of 200 kg./cm.², and reaction was effected for 3 hours at a temperature of 240°–260° C. The reaction product was analyzed to obtain 14.2 g. of N,N-dimethylacetamide. The yield of the N,N-dimethylacetamide based on the starting trimethylamine is 76.8%.

EXAMPLE 8

To an autoclave were fed 1.18 g. of trimethylamine, 12.5 g. of acetic acid and 20 mg. mols per mol of the trimethylamine of cobalt metal obtained by reducing cobalt oxide with hydrogen. Into the autoclave was introduced under pressure carbon monoxide to a pressure of 204 kg./cm.², and reaction was effected for 3 hours at a temperature of 240°–265° C. to obtain 12.1 g. of N,N-dimethylacetamide. The yield of the N,N-dimethylacetamide based on the starting trimethylamine is 69.5%.

EXAMPLE 9

To an autoclave were fed 12.3 g. of trimethylamine, 12.8 g. of acetic acid and 22 mg. mols per mol of the trimethylamine of nickel iodide ($NiI_2$). Into the autoclave was introduced under pressure carbon monoxide to a pressure of 208 kg./cm.², and reaction was effected for 3 hours at a temperature of 246°–270° C. to obtain 13.9 g. of N,N-dimethylacetamide. The yield of the N,N-dimethylacetamide based on the starting trimethylamine is 76.7%.

EXAMPLE 10

To an autoclave were fed 10.4 g. of trimethylamine, 11.2 g. of acetic acid, and 21 mg. mols and 22 mg. mols per mol of the trimethylamine of iron hydroxide [$Fe(OH)_3$] and iodine ($I_2$), respectively. Into the autoclave was introduced under pressure carbon monoxide to a pressure of 210 kg./cm², and reaction was effected for 3 hours at a temperature of 240°–260° C. to obtain 9.8 g. of N,N-dimethylacetamide. The yield of the N,N-dimethylacetamide based on the starting trimethylamine is 63.8%.

EXAMPLE 11

To an autoclave were fed 11.6 g. of trimethylamine, 12.0 g. of acetic acid, and 18 mg. mols and 16 mg. mols per mol of the trimethylamine of cobalt hydroxide [$Co(OH)_2$] and iodine ($I_2$), respectively. Into the autoclave was introduced under pressure carbon monoxide to a pressure of 200 kg./cm.², and reaction was effected for 3 hours at a temperature of 240°–260° C. to obtain 15.4 g. of N,N-dimethylacetamide. The yield of the N,N-dimethylacetamide based on the starting trimethylamine is 90%.

EXAMPLE 12

To an autoclave were fed 12.0 g. of trimethylamine, 12.6 g. of acetic acid, and 19 mg. mols and 21 mg. mols per mol of the trimethylamine of cobalt acetate [$(CH_3CO_2)_2Co \cdot 4H_2O$] and potassium bromide (KBr), respectively. Onto the autoclave was introduced under pressure carbon monoxide to a pressure of 208 kg./cm.², and reaction was effected for 3 hours at a temperature of 240°–260° C. to obtain 15.2 g. of N,N-dimethylacetamide. The yield of the N,N-dimethylacetamide based on the starting trimethylamine is 86%.

For comparison, referential examples are shown below.

Referential Example 1

This example shows the case where trimethylamine was reacted with acetic acid in the presence of only carbon monoxide and a halogen without using a metal carbonyl as a catalyst.

To an autoclave were fed 11.8 g. of trimethylamine, 12.4 g. of acetic acid and 20 mg. mols per mol of the trimethylamine of iodine ($I_2$). Into the autoclave was introduced under pressure carbon monoxide to a pressure of 210 kg./cm.², and reaction was effected for 3 hours at a temperature of 250°–270° C. to obtain 8.0 g. of N,N- dimethylacetamide. The yield of the N,N-dimethylacetamide based on the starting trimethylamine is 46%.

Referential Example 2

To a 100 ml., Hastelloy C-made, shaking type autoclave were fed 16.1 g. of trimethylamine, and 15 mg. mols and 22 mg. mols per mole of the trimethylamine of cobalt acetate [$(CH_3CO_2)_2Co \cdot 4H_2O$] and potassium iodide (KI), respectively. Into the autoclave was introduced under pressure carbon monoxide to a pressure of 182 kg./cm.$^2$, and reaction was effected for 2 hours at a temperature of 240°–250° C. under a pressure of 390–165 kg./cm.$^2$. After completion of the reaction, the pressure lowered to 80 kg./cm.$^2$. According to the above reaction N,N-dimethylamide was obtained in a yield of 20.1% based on the starting trimethylamine.

We claim:
1. A process for preparing N,N-dimethylamides of lower fatty acids which comprises reacting trimethylamine with an acyl group-containg compound selected from the group consisting of lower fatty acids, esters thereof, and compounds capable of forming said acids or esters under the reaction conditions, and with carbon monoxide at a temperature of 150°–320° C. under pressure of 100–600 kg./cm.$^2$ (gauge), using as a catalyst a carbonyl of a metal selected from the group consisting of cobalt, nickel and iron.

2. A process according to claim 1, wherein the acyl group-containing compound is selected from the group consisting of acetic acid, propionic acid, butyric acid and esters thereof.

3. A process according to claim 1, wherein the compound capable of forming the lower fatty acid or ester thereof under the reaction conditions is selected from the group consisting of lower aliphatic alcohols and lower aliphatic ethers.

4. A process for preparing N,N-dimethylamides of lower fatty acids which comprises reacting trimethylamine with an acyl group-containing compound selected from the group consisting of lower fatty acids, esters thereof, and compounds capable of forming said acids or esters under the reaction conditions, and with carbon monoxide at a temperature of 150°–320° C. under a pressure of 100–600 kg./cm.$^2$ (gauge), using as a catalyst a carbonyl of a metal selected from the group consisting of cobalt, nickel and iron, in combination with a halogen and/or a metal halide.

5. A process according to claim 4, wherein the acyl group-containing compound is selected from the group consisting of acetic acid, propionic acid, butyric acid and esters thereof.

6. A process according to claim 4, wherein the compound capable of forming the lower fatty acid or ester thereof under the reaction conditions is selected from the group consisting of lower aliphatic alcohols and lower aliphatic ethers.

References Cited

UNITED STATES PATENTS 3,446,842  5/1969  Nozaki _____ 260—561

LEWIS GOTTS, Primary Examiner

E. G. LOVE, Assistant Examiner

U.S. Cl. X.R.

260—488R, 541, 614R